United States Patent [19]

Fawks, Jr.

[11] Patent Number: 5,923,717
[45] Date of Patent: *Jul. 13, 1999

[54] METHOD AND SYSTEM FOR DETERMINING NUCLEAR CORE LOADING ARRANGEMENTS

[75] Inventor: James E. Fawks, Jr., Wilmington, N.C.

[73] Assignee: General Electric Company, Schenectady, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/592,887

[22] Filed: Jan. 29, 1996

[51] Int. Cl.$^6$ ..................................... G21C 17/00
[52] U.S. Cl. ............................ 376/245; 376/267
[58] Field of Search ................... 376/267, 245, 376/259

[56] References Cited

U.S. PATENT DOCUMENTS 5,631,939  5/1997  Haraguchi et al. ..................... 376/267

FOREIGN PATENT DOCUMENTS 0 596 738 A1  11/1993  European Pat. Off. .
072444184  9/1905  Japan .

OTHER PUBLICATIONS

XP 000653396, *Nuclear Science and Engineering*, 121, pp. 312–325 (1995): "Employing Nodal Generalized Perturbtion Theory for the Minimization of Feed Enrichment During Pressurized Water Reactor In–Core Nuclear Fuel Management Optimization", Maldonado et al.

XP 000653395, *Nuclear Science and Engineering*, 118, pp. 67–78 (1994): "Autoload, An Automatic Optimal Pressurized Water Reactor Reload Design System with an Expert Module", Li et al.

XP 000653397, *Nuclear Science and Engineering*, 115, pp. 152–163 (1993): "Optimal Fuel Loading Pattern Design Using an Artificial Neural Network and a Fuzzy Rule–Based System", Kim et al.

XP 000653472, *Nuclear Technology*, vol. 74, Jul. 1986, pp. 5–13: "Automatic Determination of Pressurized Water Reactor Core Loading Patterns that Maximize Beginning-of-Cycle Reactivity Within Power–Peaking and Burnup Constraints", Hobson et al.

Nuclear Technology, vol. 61, pp. 78–92, Yeh et al, Apr. 1983.

*Primary Examiner*—Harvey E. Behrend
*Attorney, Agent, or Firm*—Armstrong Teasdale LLP

[57] ABSTRACT

The present invention, in one aspect, is a method for identifying an optimum core loading arrangement. The method generally has an initialization phase and a running, or search, phase. In the initialization phase, an initial core loading arrangement is identified based on the relative reactivity levels of the bundles to be loaded and the reactor core locations. Once the initial core loading arrangement is identified, such arrangement is then optimized, within the defined constraints, in the running phase. More specifically, in the running phase, each core location is analyzed to determine whether such core location reactivity level can be changed from the initial reactivity level to either satisfy a constraint or optimize cycle energy, or both.

20 Claims, 1 Drawing Sheet

METHOD AND SYSTEM FOR DETERMINING NUCLEAR CORE LOADING ARRANGEMENTS

FIELD OF THE INVENTION

This invention relates generally to nuclear reactors and more particularly, to identifying optimum fuel bundle loading arrangements in a nuclear core.

BACKGROUND OF THE INVENTION

A nuclear reactor core has many, e.g., several hundred, individual fuel bundles that have different characteristics. Such bundles preferably are arranged within the reactor core so that the interaction between the fuel bundles satisfies all regulatory and reactor design constraints, including governmental and customer specified constraints. In addition to satisfying the design constraints, since the core loading arrangement determines the cycle energy, i.e., the amount of energy that the reactor core generates before the core needs to be refreshed with new fuel elements, the core loading arrangement preferably optimize the core cycle energy.

To optimize core cycle energy, the higher reactivity bundles generally are positioned at an inner core location. To satisfy some design constraints, however, higher reactivity bundles generally are positioned at an outer core location. Identifying the preferred core loading arrangement therefore is an optimization with constraints challenge.

The number of bundle arrangements, or configurations, possible in the reactor core can be in excess of one hundred factorial. Of these many different possible configurations, only a small percentage of such configurations satisfy all applicable design constraints. In addition, only a small percentage of the configurations that satisfy all applicable design constraints are economical.

Traditionally, core loading arrangement determinations are made on a trial and error basis. Specifically, and based on past experience of the engineers, a core loading arrangement is identified. The identified core loading arrangement is then simulated in a computer. If a particular design constraint is not satisfied by the identified arrangement, then the arrangement is modified and another computer simulation is run. Man-weeks of resources typically are required before an appropriate core loading arrangement is identified using the above described procedure.

In addition, once a core loading arrangement that satisfies all design constraints has been identified using the trial and error approach, such identified core arrangement may not provide the actual maximum cycle energy. Therefore, the trial and error process continues until the engineers believe that the optimum core arrangement has been identified. In practice, however, it is possible that a particular core arrangement that is not necessarily consistent with the engineers' past experience may be the actual optimum core arrangement. Such actual optimum core arrangement, however, may not necessarily be identified through the trial and error process.

Since the core arrangement problem generally is considered unique for each reactor and bundle characteristics, no known algorithm provides a viable solution for identifying optimum reactor core arrangements. In addition, expert systems have not been used on a broad basis since a standard set of rules typically are not applicable over a wide range of situations to the many unique and complex core loading arrangements which differ in all reactors.

It would be desirable, of course, to reduce the time required to identify a core loading arrangement which optimize cycle energy and satisfies all design constraints. It also would be desirable to provide a methodology applicable to a wide range of reactors for consistently and reliably identifying optimum core loading arrangements.

SUMMARY OF THE INVENTION

These and other objects may be attained by the present invention which in one aspect is a method for identifying an optimum core loading arrangement. The method generally has two (2) phases. The first phase is an initialization phase and the second phase is the running, or search, phase. In the initialization phase, an initial core loading arrangement is identified based on the relative reactivity levels of the bundles to be loaded and the reactor core locations.

Once the initial core loading arrangement is identified, such arrangement is then optimized, within the defined constraints, in the running phase. More specifically, in the running phase, each core location is analyzed to determine whether such core location reactivity level can be changed from the initial reactivity level to either satisfy a constraint or optimize cycle energy, or both.

Subsequent to analyzing each core location as described above, random core loading arrangements are created and compared with the then best case loading arrangement identified. Such randomly generated core loading arrangements sometimes are referred to as "random jumps", and such "random jumps" are made to potentially identify previously unconsidered core loading arrangements that may be more optimum than the most optimum arrangement identified up to that point in processing.

In another aspect, the present invention is a system including a computer programmed to execute the above described initialization and running phase routines. By programming a computer to perform such routines, the amount of engineer time required to identify a core loading arrangement which optimize cycle energy and satisfies all design constraints can be reduced. In addition, such a method and system are believed to be applicable to a wide range of reactors for consistently and reliably identifying optimum core loading arrangements.

DETAILED DESCRIPTION OF THE DRAWINGS

In one aspect, the present invention is a method for identifying an optimum core loading arrangement. The method can be generally understood as having two (2) phases. The first phase is an initialization phase and the second phase is the running, or search, phase. Generally, in the initialization phase, an initial core loading arrangement is identified, and in the running phase, the core loading arrangement is optimized within the design constraints.

In another aspect, the present invention is a system including a computer programmed to execute the method described in detail below. The method can be practiced, for example, on most any type of computer including even a personal computer. The type of computer selected depends primarily on the speed at which the operator desires to have the optimum fuel loading arrangement identified and the amount of memory required for any particular operation. Such speed and memory requirements may, of course, vary depending upon the number of reactors being analyzed and the number of fuel bundles in the reactor cores. The method is not limited to practice on any one particular type of computer.

Figure 1:
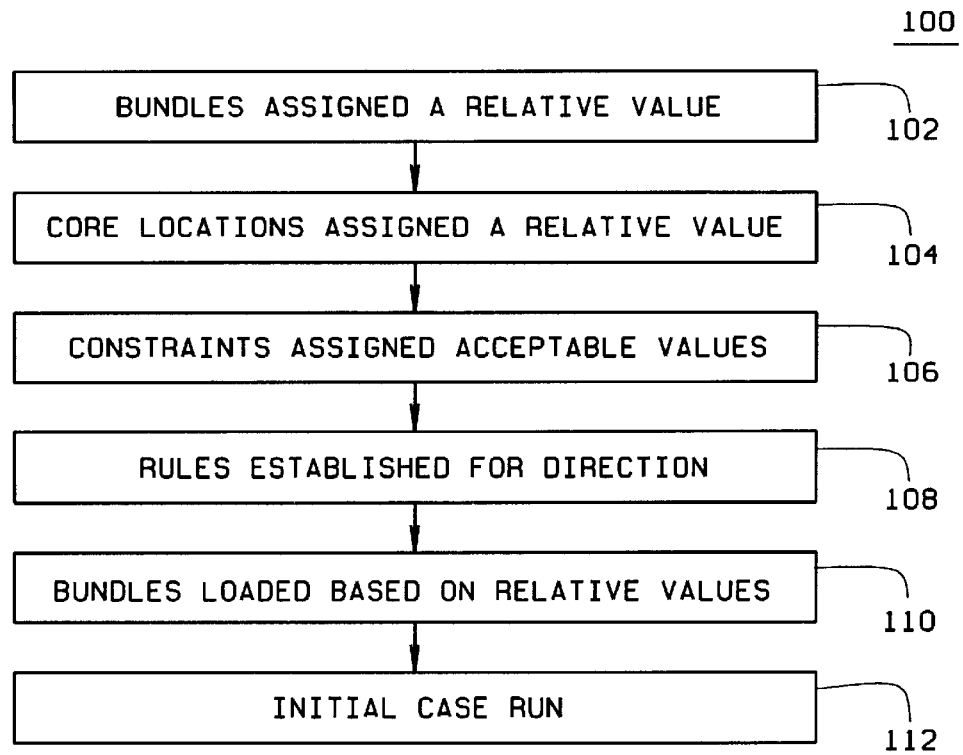
FIG. 1 is a flow chart illustrating a sequence of process steps executed in the initialization phase for identifying an optimum core loading arrangement in accordance with one embodiment of the present invention.

Referring now specifically to FIG. 1, a sequence of process steps 100 executed in the initialization phase for identifying an optimum core loading arrangement is illustrated. Particularly, and with respect to the fuel bundle to be loaded into a reactor core, each bundle is assigned a relative value 102 within some arbitrary range, sometimes referred to herein as the loading range. The relative value of each bundle typically is based on the reactivity of each bundle. For example, if one hundred (100) fuel bundles are to be loaded into the core, then each bundle is assigned a value within the range from one (1) to one hundred (100) based on the relative reactivity of that bundle. The highest reactivity bundle is assigned a value of one hundred (100) and the lowest reactivity bundle is assigned a value of one (1).

Subsequent to assigning each bundle a relative value as described above, each core location is assigned a relative value 103. The relative value of each core location typically is based on the acceptable reactivity level of each location. For example, if there are one hundred (100) core locations, then each core location is assigned a value within the range from one (1) to one hundred (100) based on the relative acceptable reactivity at that core location. The highest reactivity core location will be assigned a value of one hundred (100) and the lowest reactivity core location is assigned a value of one (1).

Once each bundle and core location is assigned a relative reactivity based value, the design constraints are identified and acceptable values or ranges are assigned to each constraint. As an example, the reactor shutdown margin design constraint may be one percent (1%). Reactor shutdown margin depends, at least in part, on the bundle reactivity and location. Therefore, the shutdown margin design constraint can be affected based on the bundle arrangement.

Rules also are established 108 for each reactor core location that specifies a direction (e.g., towards the core center or towards the core periphery) in which to move a loaded (simulated) bundle to maximize the cycle energy and/or satisfy a constraint. These rules typically are unique for each reactor and are based primarily upon the experience of the engineer. In defining the rules, each core location is evaluated separately in determining direction.

The bundle and core location relative reactivity values and the direction rules must be established for each particular loading of each reactor. Of course, once the core location relative reactivity values and direction rules are created for a particular reactor, such values and rules may remain relatively constant over a long period of time, e.g., for many cycles. However, it may be recommended to at least reevaluate such values when making a core loading arrangement determination for each cycle. The relative bundle reactivity values will, of course, vary depending upon the reactivity levels of the bundles to be loaded and generally must be created for each loading arrangement.

After determining the bundle and core location relative reactivity values and the direction rules, the bundles are loaded, in a computer simulation, into the reactor core 110. Specifically, each bundle is loaded into the core location having a core location reactivity value equal to the bundle relative reactivity value. With the bundles arranged in the core as described above, initial values for the cycle energy and design constraints are determined 112, which completes the initialization phase.

Figure 2:
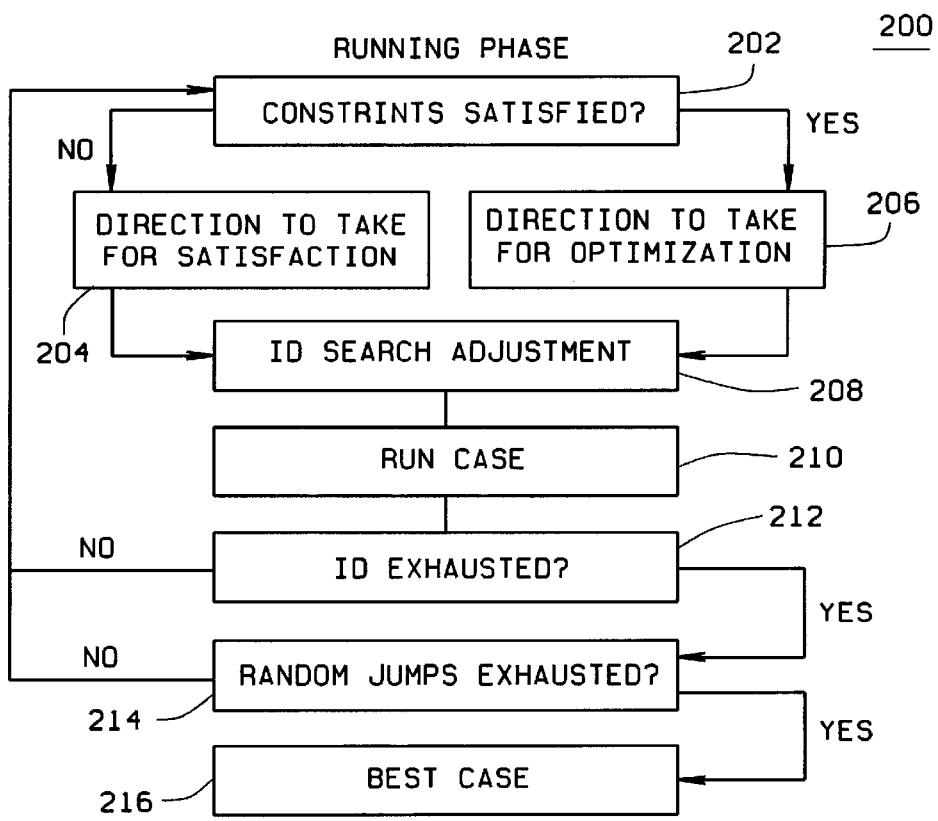
FIG. 2 is a flow chart illustrating a sequence of process steps executed in the running phase for identifying an optimum core loading arrangement in accordance with one embodiment of the present invention.

FIG. 2 is a flow chart illustrating a sequence of process steps 200 executed in the running, or search, phase for identifying an optimum core loading arrangement. Process steps 200 are executed subsequent to completion of initialization process steps 100 illustrated in FIG. 1. Referring to FIG. 2, and for a first core location either selected at random or sequentially, each constraint for that location calculated in the last step of the initialization phase is checked 202 to determine whether the calculated values of the constraints are acceptable constraint values as determined in step 106 (FIG. 1). If one or more constraint is not satisfied, then the rule base created in step 108 (FIG. 1) is searched to determine the direction the value of the core location should be changed in order to satisfy the constraint 204. This means that if at the particular core location, a design constraint is not satisfied, then the relative reactivity level at the subject core location typically must be changed. The rule base, as explained above, may contain a rule that indicates whether the reactivity level at the subject core location should be increased or decreased, depending upon the specific conditions created by the particular core loading arrangement.

If all constraints are satisfied at the subject core location, then the rule base is searched to determine the direction the value of the core location should be changed in order to maximize cycle energy 206. This means that based on the specific conditions created by the particular core loading arrangement, a rule in the rule base may indicate the direction in which the particular core location should be changed in order to improve cycle energy. The term direction refers to the relative reactivity level. Therefore, the rule from the rule base will indicate that the reactivity level at the identified core location should be changed in order to improve cycle energy.

If no rules are available for a particular condition, e.g., an unsatisfied constraint or a particular cycle energy, then a reactivity level change is randomly selected for the core location. In any event, and in accordance with the foregoing, the reactivity value of the core location is changed and the bundles are re-arranged in the core so that the bundle reactivity level matches the reactivity level of its assigned core location 208.

Once the new core arrangement has been made, new constraint values and cycle energy are determined for the new arrangement 210. If every core location has not been evaluated as explained above in connection with step 202 through 210, then another core location is either randomly or sequentially selected for analysis and processing returns to step 202 to perform the above described analysis in connection with the newly selected core location.

The purpose for the above described searching, or evaluation, is to identify a most optimum core loading arrangement. Such searching can be performing in either a "depth" or "breadth" mode of operation. In the depth mode, once a change has been made that results in an improved core loading arrangement, then the subsequent change is made to such alternative arrangement. That is, processing continues by using the improved arrangement as the "base" arrangement and processing does not return to the initial, less optimum, core loading arrangement. Once all the core locations have been changed, the core loading arrangement under analysis is then selected as the best arrangement for further processing as described below.

In the breadth mode, each alternative core loading arrangement is analyzed with respect to the initial core loading arrangement. This means that after evaluation of a new arrangement, and even if the new arrangement is an improvement over the initial arrangement, the next arrangement considered is a variation of the initial arrangement. That is, processing returns to the initial arrangement and selects another core location to change. Once all the core locations have been changed, then the best alternative arrangement is selected for further processing as described below.

Once all locations have been perturbed and no further improvements are found, then random initial loading arrangement are generated 214 for analysis. The most optimum core loading arrangement identified up to this point in processing is selected for comparison to the random initial loading arrangements. Such "random jumps" are made to potentially identify previously unconsidered core loading arrangements that may be more optimum than the most optimum arrangement identified up to that point in processing. For example, a particular randomly selected core location may have its reactivity level changed. With such a change in the reactivity level at that core location, the bundles are re-arranged in the core so that the bundle reactivity level matches the reactivity level of its assigned core location. Once the core is so arranged, processing returns to step 202 to determine whether the randomly selected core arrangement is more optimum than the best known core loading arrangement.

The number of random jumps executed may be selected by the operator based on the amount of time available for identifying the most optimum core loading arrangement. The number of random jumps may vary, for example, from as few as five (5) to as many as twenty (20). If the number of random jumps selected have been executed, then the most optimum core loading arrangement that satisfies all design constraints is selected as the best case 216.

The above described method for identifying the optimum core loading arrangement reduces the amount of engineer time required to identify a core loading arrangement which optimize cycle energy and satisfies all design constraints. Importantly, such method is believed to be applicable to a wide range of reactors for consistently and reliably identifying optimum core loading arrangements.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A method for identifying a core loading arrangement for loading nuclear reactor fuel bundles into a reactor core, the core loading arrangement being required to satisfy predetermined design constraints, said method comprising the steps of:

assigning each bundle a relative reactivity value within a loading range;

assigning each core location a relative reactivity value;

assigning values to each predetermined constraint;

creating rules for each reactor core location to specify a direction in which to move a bundle to maximize the cycle energy or satisfy a predetermined constraint, or both;

initially simulating a core loading wherein each bundle is loaded into the core location having a core location reactivity value equal to the bundle relative reactivity value; and determining initial values for cycle energy and design constraints for the initial core loading arrangement.

2. A method in accordance with claim 1 wherein each core location is assigned a relative reactivity value based on the acceptable reactivity level of each core location.

3. A method in accordance with claim 1 further comprising the step of identifying an optimum core loading arrangement based on the initial core loading arrangement.

4. A method in accordance with claim 3 wherein identifying the optimum core loading arrangement comprises the steps of:

selecting a first core location;

determining whether the initial core loading arrangement satisfies the design constraints at the first core location; and if at least one design constraint is not satisfied at the first core location, then searching the rules to determine a direction in which the reactivity value of the first core location should be changed in order to satisfy the constraint.

5. A method in accordance with claim 4 further comprising the step of:

searching the rules to determine a direction in which the reactivity value of the core location should be changed in order to improve cycle energy if all the design constraints are satisfied at the first core location.

6. A method in accordance with claim 5 further comprising the step of randomly selecting a reactivity level change for the first core location if there is no rule for changing the first core location reactivity value.

7. A method in accordance with claim 5 further comprising the step of determining new constraint values and cycle energy for the core loading arrangement which results from changing the reactivity value of the first core location.

8. A method in accordance with claim 3 wherein identifying the optimum core loading arrangement comprises the steps of:

(i) selecting a core location;

(ii) determining whether the initial core loading arrangement satisfies the design constraints at the selected core location;

(iii) if at least one design constraint is not satisfied at the selected core location, then searching the rules to determine a direction in which the reactivity value of the selected core location should be changed in order to satisfy the constraint;

(iv) if all the design constraints are satisfied at the selected core location, then searching the rules to determine a direction in which the reactivity value of the selected core location should be changed in order to improve cycle energy;

(v) if there is no rule for changing the first core location reactivity value, then randomly selecting a reactivity level change for the selected core location; and (vi) determining new constraint values and cycle energy for the core loading arrangement which results from changing the reactivity value of the selected core location.

9. A method in accordance with claim 8 wherein each core location is selected and steps (ii)–(vi) are performed for each such selected core location.

10. A method in accordance with claim 9 wherein each core location is analyzed using a depth mode of operation, the depth mode providing that once a change has been made that results in an improved core loading arrangement, then any subsequent change is made to such alternative arrangement in performing steps (ii)–(vi).

11. The method in accordance with claim 9 wherein each core location is analyzed using a breadth mode of operation, the breadth mode providing that each alternative core loading arrangement is analyzed with respect to the initial core loading arrangement in performing steps (ii)–(iv).

12. The method in accordance with claim 9 further comprising the step of generating random core loading arrangements.

13. The method in accordance with claim 12 further comprising the step of selecting a core loading arrangement which satisfies all design constraints and has the highest cycle energy as a best case core loading arrangement.

14. A system for identifying a core loading arrangement for loading nuclear reactor fuel bundles into a reactor core, the core loading arrangement being required to satisfy predetermined design constraints, said system comprising a computer having a memory storage, said memory storage having stored therein a relative reactivity value within a loading range assigned to each bundle, a relative reactivity value assigned to each reactor core location, values assigned to each predetermined design constraint, and rules for each reactor core location which specify a direction in which to move the core location reactivity level to maximize the cycle energy or satisfy a predetermined constraint, or both, said computer programmed to:

initially simulate a core loading in which each bundle is loaded into the respective core location having a core location reactivity value equal to the bundle relative reactivity value; and determine initial values for cycle energy and the design constraints for the initial core loading arrangement.

15. A system in accordance with claim 14 wherein to identify an optimum core loading arrangement, said computer is further programmed to:

select a first core location;

determine whether the initial core loading arrangement satisfies the design constraints at the first core location; and search the rules to determine a direction in which the reactivity value of the core location should be changed in order to satisfy a design constraint if the design constraint is not satisfied at the first core location.

16. A system in accordance with claim 15 wherein said computer is further programmed to:

search the rules to determine a direction in which the reactivity value of the core location should be changed in order to improve cycle energy if all the design constraints are satisfied at the first core location.

17. A system in accordance with claim 16 wherein said computer is further programmed to:

determine new constraint values and cycle energy for the core loading arrangement which results from changing the reactivity value of the first core location.

18. A system in accordance with claim 14 wherein to identify an optimum core loading arrangement said computer is programmed to:

(i) select a core location;

(ii) determine whether the initial core loading arrangement satisfies the design constraints at the selected core location;

(iii) if at least one design constraint is not satisfied at the selected core location, then search the rules to determine a direction in which the reactivity value of the selected core location should be changed in order to satisfy the constraint;

(iv) if all the design constraints are satisfied at the first core location, then search the rules to determine a direction in which the reactivity value of the selected core location should be changed in order to improve cycle energy;

(v) if there is no rule for changing the selected core location reactivity value, then randomly select a reactivity level change for the selected core location; and (vi) determine new constraint values and cycle energy for the core loading arrangement which results from changing the reactivity value of the selected core location.

19. A system in accordance with claim 18 wherein each core location is selected and steps (ii)–(vi) are performed for each such selected core location.

20. A system in accordance with claim 19 wherein said computer is programmed to select a core loading arrangement which satisfies all design constraints and has the highest cycle energy as a best case core loading arrangement.

* * * * *